(No Model.) 2 Sheets—Sheet 1.
H. L. FREEMAN.
LAWN MOWER.
No. 483,913. Patented Oct. 4, 1892.
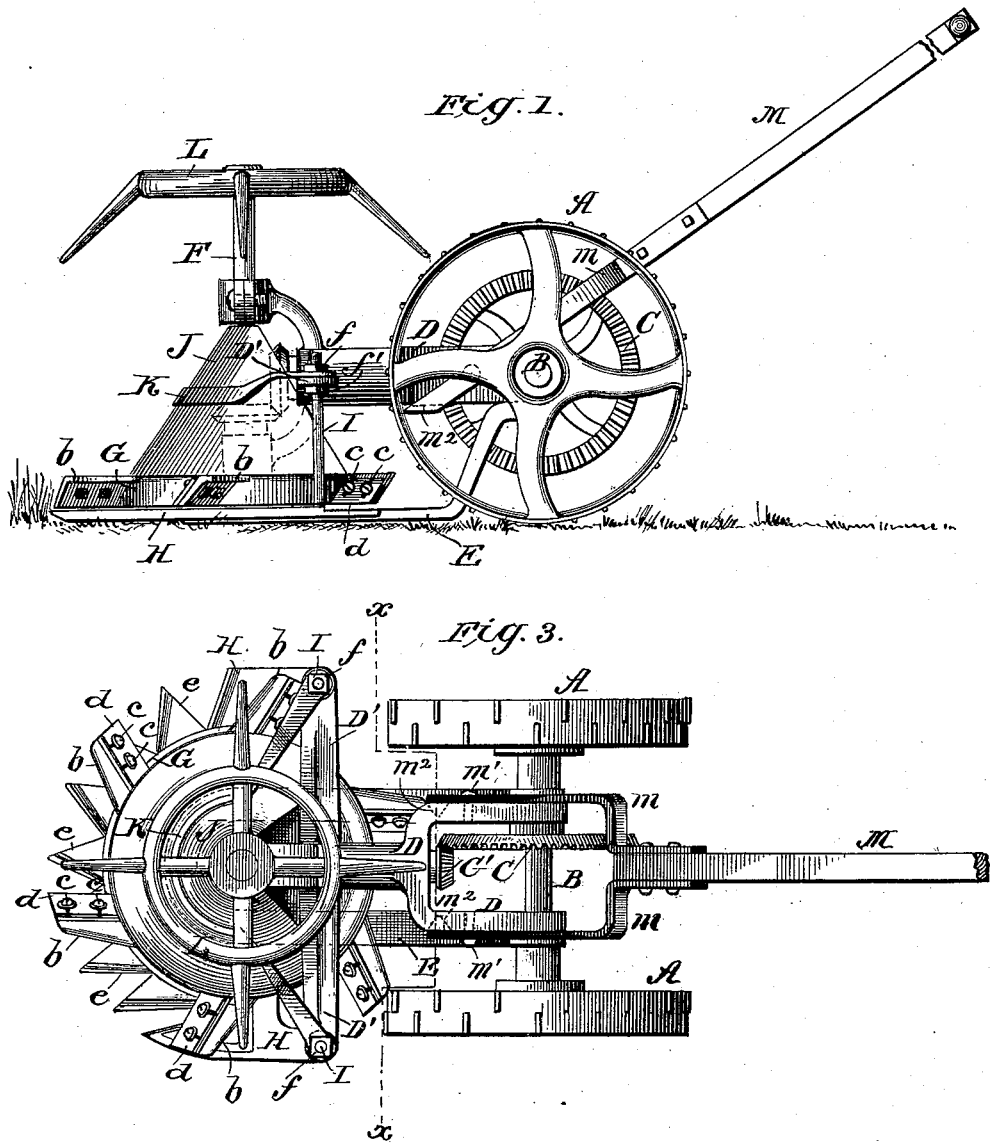
WITNESSES:
Fred J. Dieterich
Edw. W. Byrn.
INVENTOR:
Horace L. Freeman
BY Munn & Co.
ATTORNEYS (No Model.) 2 Sheets—Sheet 2.
H. L. FREEMAN.
LAWN MOWER.
No. 483,913. Patented Oct. 4, 1892.
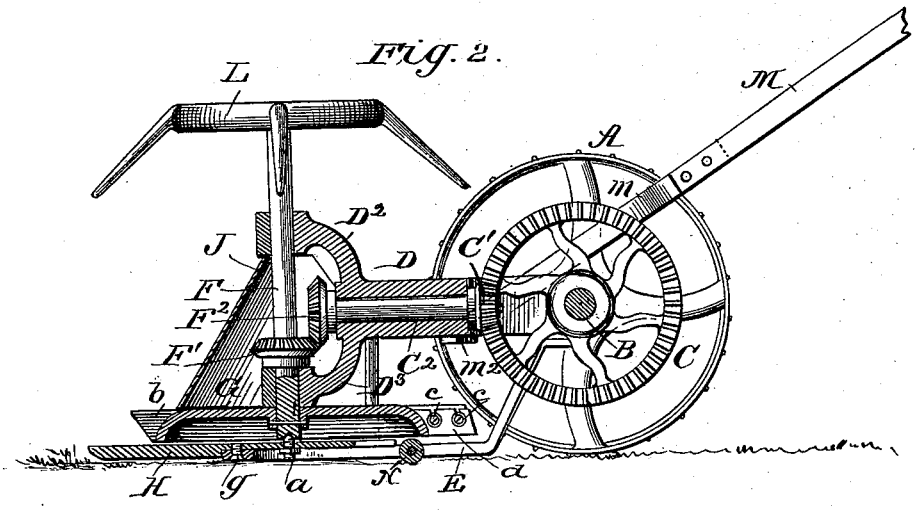
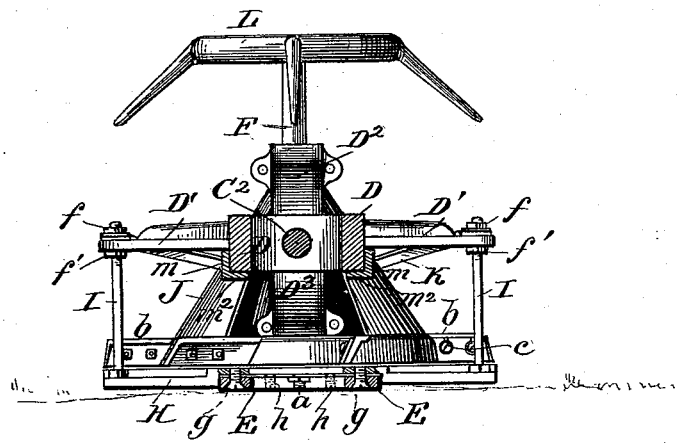
WITNESSES:
Fred G. Dieterich
Edw. W. Byrn
INVENTOR:
Horace L. Freeman
BY
ATTORNEYS

UNITED STATES PATENT OFFICE.

HORACE L. FREEMAN, OF LEXINGTON, NORTH CAROLINA.

LAWN-MOWER.

SPECIFICATION forming part of Letters Patent No. 483,913, dated October 4, 1892.

Application filed May 24, 1892. Serial No. 434,118. (No model.)

*To all whom it may concern:*

Be it known that I, HORACE L. FREEMAN, of Lexington, in the county of Davidson and State of North Carolina, have invented a new and useful Improvement in Lawn-Mowers, of which the following is a specification.

My invention is designed to provide a new form of lawn-mower. Its special objects are to cut the full width of the machine; to cut high grass and weeds as well as short grass; to cut close to such objects or obstructions as fences, curbstones, shrubs, and flowers without requiring any trimming after the machine, and to facilitate the sharpening and adjustment of the knives.

To these ends my invention consists in the peculiar construction and arrangement of the lawn-mower hereinafter shown and described.

Figure 1 is a side elevation of the mower. Fig. 2 is a vertical central longitudinal section. Fig. 3 is a plan view, and Fig. 4 is a vertical transverse section through line $x\,x$ of Fig. 3.

In the drawings, A A represent the main driving-wheels, which run upon the ground and are formed with hollow hubs provided with suitable ratchet mechanism, as is well known, to impart a rotary motion to the main shaft B when moved forwardly, and permitting free revolution on the shaft when moved backwardly. This main shaft or revolving axle has rigidly fastened to the same a large vertical driving-wheel C, which is provided with crown-teeth or bevel-teeth, to impart motion to the gear actuating the mechanism in front. This mechanism is supported by a framework consisting of two main parts, first, a bifurcated frame D and a yoke-shaped frame E. The bifurcated frame D lies in or about the horizontal plane of the axle, but dips slightly down in front, while the yoke-shaped frame E is bent downwardly from the axle to, or nearly to, the ground-level and then extends forwardly with its loop portion in or about a horizontal plane. The rear ends of the branches of the bifurcated frame D are perforated to receive the axle and are hung upon the same. The middle portion of this frame is tubular, and through it extends a shaft $C^2$, which bears at its rear end a pinion or small bevel-gear $C'$, that meshes with and receives motion from the main gear-wheel C. At its forward end the frame D is provided with four branches, two horizontal branches or arms $D'\,D'$, one on each side, and an upper and lower arm $D^2\,D^3$. In these upper and lower arms are formed journal-bearings for a vertical shaft F, which bears between said bearings a rigidly-attached bevel-gear $F'$, that meshes with and receives motion from a corresponding bevel-gear $F^2$ on the forward end of the shaft $C^2$.

At its lower end the vertical shaft F bears a horizontal cutter-wheel G, which is concaved on its under surface and stepped upon a central subjacent bearing $a$ on the finger-bar plate H below. This cutter-wheel is provided around its periphery with any suitable number of projecting knife-seats $b$, having inclined forward edges, to which are secured, by adjusting-screws $c\,c$, the slatted knife-plates $d$.

The finger-bar plate H is of a generally semicircular shape, and on its rounded edge is formed a series of finger bars or guards $e$, whose upper edges are ground or filed sharp, to engage with the knives to cut the grass between them, like the two blades of a pair of shears. The forward edge of finger-bars $e$ should be more prominent than the rear edge, so as to present as small wearing-surface as possible.

The finger-bar plate H is secured to both the upper and lower frames to the upper frame D by means of vertical tie-rods I, which extend up to and are connected with the horizontal arms $D'\,D'$, said rods being screw-threaded at their upper ends and provided with nuts $f\,f'$ at both top and bottom of the arms, so as to permit the finger-bar plate to be slightly raised or lowered in adjusting it to the proper relation to the knives above as wear takes place. The finger-bar plate H is also secured adjustably to the forward loop-shaped portion of the frame E, which passes beneath the said plate and is connected to it by six screws $g\,g\,g$ and $h\,h\,h$. Of these screws $g$ extend through the frame E from below and are tapped or threaded in the plate H, to fasten the latter down, while $h$ are screw-threaded in the frame E and bear against the plate H, to limit its approach to the subjacent frame, thus furnishing further means of adjusting this plate H to the cutter-wheel.

J is a conical shield which covers the cutter-wheel and driving-gears in front and excludes therefrom grass and trash. This shield is held in place by a curved bar K, embracing the same and fastened at its ends to the horizontal arms D' D' by the same nuts that secure the rods I.

L is a horizontal wheel fastened to the top of the cutter-wheel shaft above the shield. This wheel is provided with any suitable number of downwardly-inclined arms that act as a rake or reel to bend over long grass and weeds while they are being cut and to discharge the same from the machine after being cut, so that they will not choke or obstruct the cutter.

M is the handle. This is in the form of a long lever with metal branches $m$ $m$ bolted to each side at the lower end. These metal branches are perforated and receive a screw $m'$, to pivotally connect them to the frame D. The lower ends of these branches are provided, also, with lips $m^2$ that are turned under the frame D, which lips enable the handle to get a purchase upon the machine for tilting it or raising its front end.

The bearing $a$, upon which the cutter-wheel is stepped, is a screw inserted from the under side of the plate and retained by a nut. This forms an adjustable step-bearing for the shaft capable of taking up lost motion.

N, Fig. 2, is a small roller journaled in the yoke-shaped frame between its branches, to run upon the ground beneath the cutter-wheel.

The guards or finger-bars have their front or cutting edges more prominent than the rear, so as to present a small amount of wearing surface to the knives, and also to facilitate regrinding.

I am aware that it is not broadly new to provide a semicircular finger-bar with a revolving cutter arranged upon a vertical axis, and connected and driven by bevel-gears from the running wheels behind the same, and I therefore only claim my peculiar construction and arrangement of parts as shown and described.

Having thus described my invention, what I claim as new is—

1. The frame D, having a central tubular portion with bifurcated branches at its rear end with bearings for the axle, and with vertical arms $D^2$ $D^2$ at its front end with bearings for the vertical cutter-shaft, and also with horizontal arms D' D' at its front end, in combination with the axle B, with gear-wheel C, the shaft $C^2$, arranged within the tubular part of frame D and carrying bevel-gear C' at its rear end and bevel-gear $F^2$ at its front end, and the vertical cutter-shaft F, arranged in the arms $D^2$, the finger-bar plate, and rods I, connecting the same to the horizontal arms D', substantially as shown and described.

2. The means for adjusting the revolving cutter and subjacent finger-bar plate in relation to each other, consisting of the frame-arms D' D', rods I, connecting the same to the finger-bar plate, and having nuts $f$ $f'$ on opposite sides of the arms at the upper ends of the rods, the yoke-shaped frame E, with screws $g$ and $h$ for connecting the same to the finger-bar plate, the revolving cutter-shaft and set-screw $a$, tapped through the finger-bar plate and forming the step-bearing for the cutter-shaft, substantially as shown and described.

HORACE L. FREEMAN.

Witnesses:
FLETCHER R. LOFTIN,
JNO. H. MOYER.